US011888952B2

(12) United States Patent
Shetty et al.

(10) Patent No.: US 11,888,952 B2
(45) Date of Patent: Jan. 30, 2024

(54) TOPIC-BASED DATA ROUTING IN A PUBLISH-SUBSCRIBE MESSAGING ENVIRONMENT

(71) Applicant: VMware LLC, Palo Alto, CA (US)

(72) Inventors: Divith Shetty, Bangalore (IN); Aditya Sushilendra Kolhar, Bangalore (IN); V Vimal Das Kammath, Bangalore (IN); Rahav Vembuli, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 16/787,063

(22) Filed: Feb. 11, 2020

(65) Prior Publication Data

US 2021/0176324 A1 Jun. 10, 2021

(30) Foreign Application Priority Data

Dec. 10, 2019 (IN) .............................. 201941051035

(51) Int. Cl.
*H04L 67/562* (2022.01)
*H04L 67/55* (2022.01)
(Continued)

(52) U.S. Cl.
CPC .......... *H04L 67/55* (2022.05); *H04L 12/1859* (2013.01); *H04L 47/622* (2013.01); *H04L 51/216* (2022.05); *H04L 67/562* (2022.05)

(58) Field of Classification Search
CPC ................. H04L 67/26; H04L 12/1859; H04L 47/622; H04L 51/16; H04L 67/2809; H04L 51/14;
(Continued)

(56) References Cited

U.S. PATENT DOCUMENTS

2008/0104258 A1* 5/2008 O'Neill ................. H04L 67/325
709/228
2009/0147780 A1* 6/2009 Guo ........................ H04L 51/26
370/389
(Continued)

FOREIGN PATENT DOCUMENTS

WO WO-2021032269 A1 * 2/2021 ............. H04L 67/26

OTHER PUBLICATIONS

I. D. Wahyono, I. Fadlika, A. R. Taufani and H. Elmunsyah, "Research in Ubiquitous Network: Communication Optimization using Publish-Subscribe," 2018 Electrical Power, Electronics, Communications, Controls and Informatics Seminar (EECCIS), Batu, Indonesia, 2018, pp. 202-206 (Year: 2018).*

(Continued)

*Primary Examiner* — Oscar A Louie
*Assistant Examiner* — Messeret F Gebre
(74) *Attorney, Agent, or Firm* — Quarles & Brady LLP

(57) ABSTRACT

Techniques for providing topic-based data routing in a publish-subscribe messaging environment are disclosed. In one example, a system supported by hardware in a publish-subscribe messaging environment may include a message broker to receive topic metadata at a first instance according to a first interval into a predefined fixed topic. Further, the system may include a topic list subscriber that subscribes to the predefined fixed topic and obtains a list of topics from the message broker. Furthermore, the system may include a subscription manager to assign topics in the list of topics to a set of subscribers according to a criteria. In one example, the message broker may route data corresponding to the topics to the set of subscribers in accordance with the topics assigned to the set of subscribers.

20 Claims, 4 Drawing Sheets

(51) Int. Cl.
  *H04L 47/62* (2022.01)
  *H04L 12/18* (2006.01)
  *H04L 51/216* (2022.01)
(58) Field of Classification Search
  CPC ..... H04L 67/55; H04L 51/216; H04L 67/562; H04L 51/214; H04L 67/10015; H04W 4/60
  See application file for complete search history.

(56) References Cited

U.S. PATENT DOCUMENTS

| | | | |
|---|---|---|---|
| 2010/0150139 A1* | 6/2010 | Lawson | H04L 67/02 370/352 |
| 2012/0215872 A1* | 8/2012 | Beardsmore | H04L 51/214 709/207 |
| 2014/0286354 A1* | 9/2014 | Van De Poel | H04L 41/0273 370/463 |
| 2015/0006893 A1* | 1/2015 | Dixon | H04L 63/20 713/170 |
| 2015/0312179 A1* | 10/2015 | Ben-Ezra | H04L 67/01 709/203 |
| 2016/0286013 A1* | 9/2016 | Yu | H04L 67/1095 |
| 2019/0289434 A1* | 9/2019 | Hei | H04W 4/06 |

OTHER PUBLICATIONS

Chi, M., Liu, S., & Hu, C. (2014). Self-adapting routing overlay network for frequently changing application traffic in content-based Publish/Subscribe system. Mathematical Problems in Engineering, , 362076 (11 pp.). (Year: 2014).*

K. M. Alam, M. M. Moral, K. S. N. Ripon, B. Ray and A. Akther, "Applying Online-Based Publisher-Subscriber Network to Distribute Notice in Academic Institutions of Bangladesh," 2018 21st International Conference of Computer and Information Technology (ICCIT), Dhaka, Bangladesh, 2018, pp. 1-6 (Year: 2018).*

* cited by examiner

TOPIC-BASED DATA ROUTING IN A PUBLISH-SUBSCRIBE MESSAGING ENVIRONMENT

RELATED APPLICATION

This application claims the benefit of Foreign Application Serial No. 201941051035 filed in India entitled "TOPIC-BASED DATA ROUTING IN A PUBLISH-SUBSCRIBE MESSAGING ENVIRONMENT", on Dec. 10, 2019, by VMWARE, Inc., which is herein incorporated in its entirety by reference for all purposes.

TECHNICAL FIELD

The present disclosure relates to computing systems that exchange messages, and more particularly to methods, techniques, and systems for providing topic-based data routing in a publish-subscribe messaging environment.

BACKGROUND

Messaging architectures may execute processes to deliver data/messages from one entity to another. Example messaging architecture may be a publish-subscribe messaging system. The publish-subscribe messaging system is a form of asynchronous computer network messaging, where publishers may post data and subscribers receive the data for further processing and/or analysis. Further, the publish-subscribe messaging system may utilize message brokers to route the data from the publishers to the subscribers. Furthermore, the publish-subscribe messaging system may be implemented in different products or solutions such as application monitoring systems, and the like. In example application monitoring systems, agents (i.e., publishers) may be running in endpoints (e.g., virtual machines, physical machines, and the like) to monitor applications that are being executed in the endpoints. Further, the agents/publishers may publish corresponding data to subscribers (i.e., monitoring servers) through a central data plane (i.e., the message broker), which can consume and process the data.

Figure 1A:
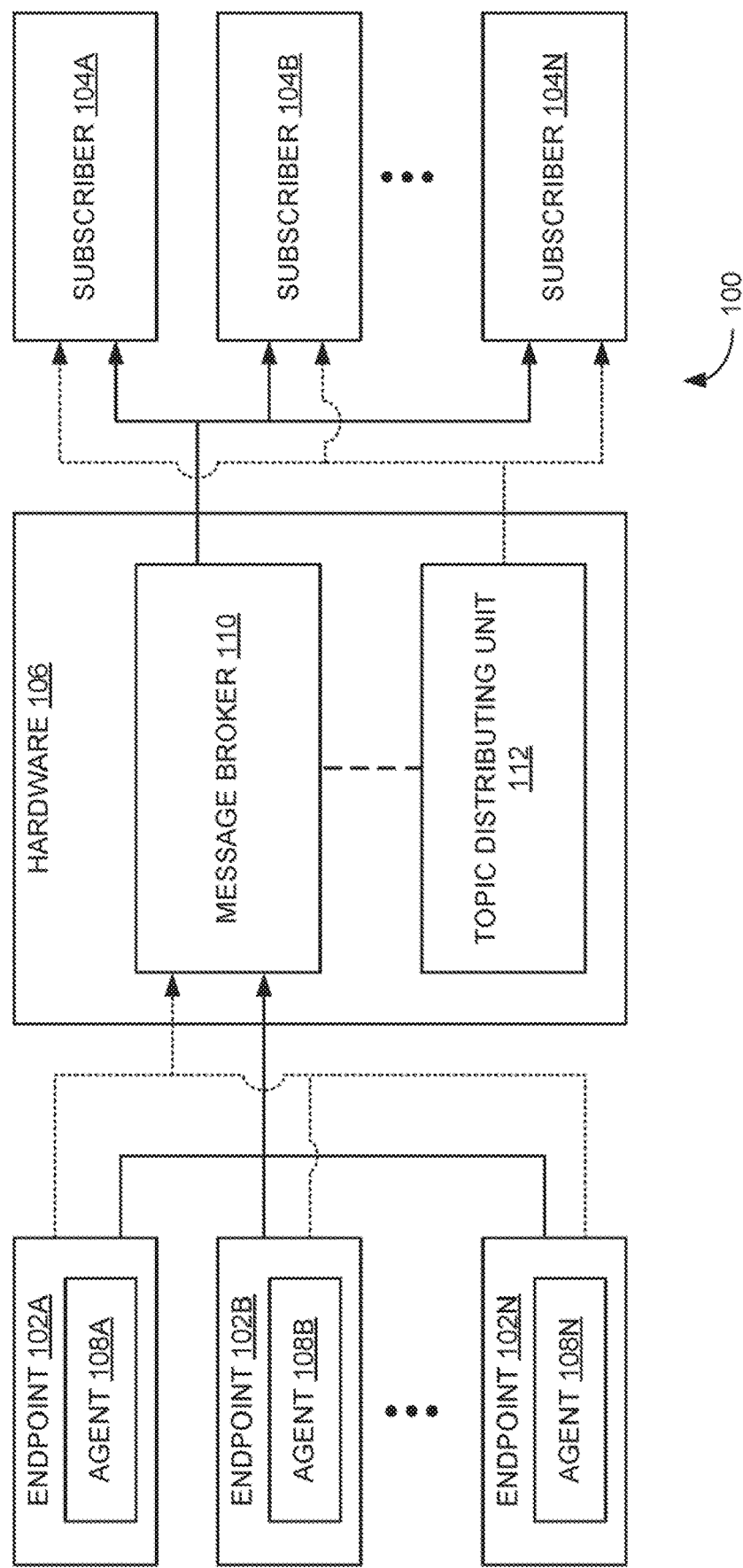
FIG. 1A is a block diagram of an example system illustrating a topic distribution unit to assign topics to a set of subscribers for routing corresponding data.

The drawings described herein are for illustration purposes only and are not intended to limit the scope of the present subject matter in any way.

DETAILED DESCRIPTION

Examples described herein may provide an enhanced computer-based and network-based method, technique, and system for providing topic-based data routing in a publish-subscribe messaging environment. Example publish-subscribe messaging environment may include multiple publishers to publish data that may be distributed to recipients known as subscribers via a message broker. Example publish-subscribe messaging environment may be applied or implemented in different products or systems such as application monitoring systems and the like.

For example, in an application monitoring system, an agent (i.e., a publisher) may be installed in each endpoint (e.g., a virtual machine, physical machine, and the like) to monitor applications being executed in the endpoints. Further, the agents may publish corresponding data to a monitoring server (i.e., a subscriber) through a central data plane (i.e., the message broker). The monitoring server may then consume and process the data. Consider a scenario where there are multiple publishers and one subscriber. In this example, the data from the multiple publishers may have to be delivered to the subscriber one after the other and the message broker may have to hold on to the data until it is delivered to the subscriber. When the subscriber does not consume the data as soon as the data is received by the message broker, load on the message broker may increase. Thus, backlog in the message broker may increase. As a result of the backlog, memory consumption of the message broker may increase and eventually lead to a crash of the message broker as the message broker starves for resources.

In some examples, the agents may distinguish the data by addressing the data using topics while publishing the data. Thus, an agent on each endpoint might publish data into multiple topics. For example, one topic may correspond to one application. Further, the subscriber may subscribe to the topics and receive the data addressed to the subscribed topics, referred as subscription. However, one subscriber may subscribe to a plurality of topics. For example, using a pattern such as erlang message queuing telemetry transport broker (eMqtt), the subscriber can use "+/#" to get the data from the plurality of topics. Since the subscription happens in a single thread, the data from all the topics may be received one after the other by the subscriber, which may lead to backlog in the message broker.

In other examples, to address the issue of data inflow against data outflow in the message broker, a number of subscribers may be increased and have the subscribers to subscribe to different portions or shards of the data. For example, different subscribers may subscribe to a different set of endpoints. However, in this scenario, the subscriber may not be aware of the topic name when the agents are dynamic in publishing the data.

Examples described herein may provide topic-based data routing in a publish-subscribe messaging environment to balance load at subscribers' side. Examples described herein may provide the system including a message broker to receive topic metadata at a first instance according to a first interval into a predefined fixed topic. Further, the system may include a topic list subscriber that subscribes to the predefined fixed topic and obtains a list of topics from the message broker. Furthermore, the system may include a subscription manager to assign topics in the list of topics to a set of subscribers according to a predefined criteria. In one example, the message broker may route data corresponding to the topics to the set of subscribers in accordance with the topics assigned to the set of subscribers.

Thus, examples described herein may provide a system which may significantly enhance consumption of data from the message broker to address message broker's memory spike. Further, examples described herein may support dynamic scaling of the number of subscribers in the set of subscribers. For example, when agents are added at runtime, their load may be distributed to existing subscribers in the set of subscribers or even new subscribers may be added into the set of subscribers to handle new load. It is to be noted that the examples described herein may describe topic-based data routing with respect to the application monitoring system. However, examples described herein may be implemented in other products or solutions supporting the publish-subscribe messaging environment to balance load at subscribers' side.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

System Overview and Examples of Operation

FIG. 1A is a block diagram of an example system 100 illustrating a topic distribution unit 112 to assign topics to a set of subscribers 104A-104N for routing corresponding data. Example system 100 may represent a publish-subscribe messaging environment. Example publish-subscribe messaging environment may include multiple endpoints 102A-102N. In one example, endpoint (e.g., 102A-102N) may include a virtual machine, a container, or a physical machine. Example physical machine may be a hardware-based device (e.g., a personal computer, a laptop, or the like) including an operating system (OS). The virtual machine may operate with its own guest OS on the physical machine using resources of the physical machine virtualized by virtualization software (e.g., a hypervisor, a virtual machine monitor, and the like). The container is a data computer node that runs on top of a host operating system without the need for a hypervisor or separate operating system.

Further, endpoints 102A-102N may include corresponding agents 108A-108N. In one example, each agent 108A-108N may run in a respective one of endpoints 102A-102N to monitor applications running on corresponding endpoints 102A-102N. An application, also referred to as an application program or application software, may be a computer software package that performs a specific function directly for an end user or, in some cases, for another application. Examples of applications may include word processors, database programs, web browsers, development tools, image editors, communication platforms, and the like.

In one example, agents 108A-108N may publish corresponding topic metadata (e.g., as shown in dotted lines from endpoints 102A-102N to a message broker 110) at a first instance according to a first interval. For example, the topic metadata may include information about a list of topics published by an agent (e.g., 108A) running in an endpoint (e.g., 102A) and each topic in the list of topics corresponds to an application running in endpoint 102A. In one example, the topic may be a category or feed name to which data is published. Further, agents 108A-108N may monitor the applications running in corresponding endpoints 102A-102N and publishes the data (i.e., corresponding to the topics) according to a second interval (e.g., as shown in continuous lines from endpoints 102A-102N to message broker 110). In one example, the second interval may be less than the first interval. For example, if the data corresponding to the topics is published every minute (i.e., the second interval), the topic metadata including the list of topics may be published every five minutes (i.e., the first interval).

As shown in FIG. 1A, system 100 may include set of subscribers 104A-104N to consume and process the published data. Further, system 100 may include a middleware such as message broker 110 to provide a store-and-forward functionality to route the data from agents 108A-108N to set of subscribers 104A-104N. In one example, message broker 110 may receive the topic metadata from agents 108A-108N at the first instance according to the first interval into a predefined fixed topic.

Further, system 100 may include topic distributing unit 112 that subscribes to the predefined fixed topic and obtains the list of topics from message broker 110. Furthermore, topic distributing unit 112 may assign topics in the list of topics to set of subscribers 104A-104N (e.g., as shown in dotted lines from topic distributing unit 112 to set of subscribers 104A-104N) based on a criteria. Components and functionalities of topic distributing unit 112 is described in FIG. 1B. Further, message broker 110 may route data corresponding to the topics to set of subscribers 104A-104N in accordance with the topics assigned to set of subscribers 104A-104N (e.g., as shown in continuous lines from message broker 110 to set of subscribers 104A-104N).

In one example, message broker 110 and topic distributing unit 112 may be implemented or supported by hardware 106 such as a computing device (e.g., cloud-based), either virtual or physical, and is communicatively coupled to endpoints 102A-102N and set of subscribers 104A-104N via a network (e.g., Wi-Fi, WiMAX, local area network (LAN), wide area network (WAN), metropolitan area network, Internet network, fixed wireless network, a wireless LAN, wireless WAN, personal area network (PAN), virtual private network (VPN), intranet, or the like). In one example, message broker 110 and topic distributing unit 112 may be part of one computing device. In another example, message broker 110 and topic distributing unit 112 may reside in different computing devices.

Figure 1B:
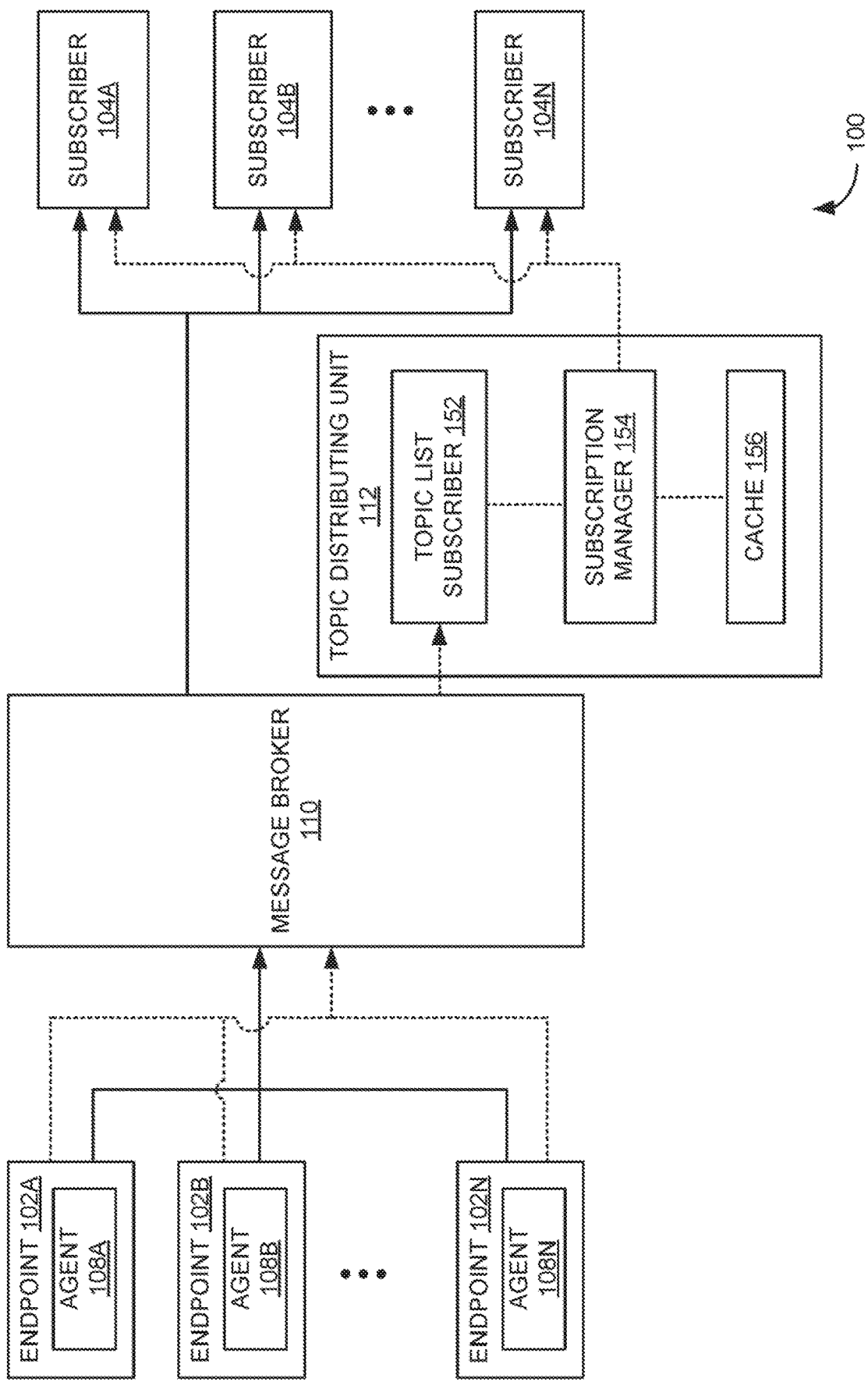
FIG. 1B is the block diagram of the example system of FIG. 1A, depicting additional features.

FIG. 1B is the block diagram of example system 100 of FIG. 1A, depicting additional features. For example, similarly named elements of FIG. 1B may be similar in structure and/or function to elements described with respect to FIG. 1A. As shown in FIG. 1B, topic distribution unit 112 may include a topic list subscriber 152, a subscription manager 154, and a cache 156.

During operation, message broker 110 may receive topic metadata at the first instance according to the first interval into the predefined fixed topic. In one example, the topic metadata may include information about a list of topics published by agent 108A running in endpoint 102A and each topic in the list of topics may correspond to an application running in endpoint 102A. For example, consider that MySQL and Tomcat applications are running in endpoint 102A. In this example, the list of topics may be sent to the predefined fixed topic "/metadata". The information about the list of topics may include "/endpoint1/MySQL" and "/endpoint1/Tomcat". Similarly, consider that MySQL and Jboss applications are running in endpoint 102B, then the list of topics may be sent to the predefined fixed topic "/metadata" and the information about the list of topics may include "/endpoint2/MySQL" and "/endpoint2/Jboss".

Further, topic list subscriber 152 may subscribe to the predefined fixed topic and obtain the list of topics from message broker 110. For example, topic list subscriber 152 may subscribe to "/metadata" to obtain the list of topics using eMqtt based pattern (e.g., "+/topics"). In one example, topic list subscriber 152 may transmit the list of topics to subscription manager 154 for assigning the topics to set of subscribers 104A-104N upon receiving the topic metadata at each instance according to the first interval.

Furthermore, subscription manager 154 may assign topics in the list of topics to set of subscribers 104A-104N according to a criteria. For example, "/endpoint1/MySQL" and "/endpoint2/MySQL" may be assigned to subscriber 104A and "/endpoint1/Tomcat" may be assigned to subscriber 104B. In one example, subscription manager 154 may assign the topics to set of subscribers 104A-104N using the predefined criteria such as a round robin distributing algorithm, a hashing algorithm, a priority scheduling algorithm, or the like.

For example, in hashing algorithm, consider there are 'N' number of subscribers in set of subscribers 104A-104N indexed from 0 to n−1. In this example, a hash of each topic may be computed, and the computed hash value may be used to select index between 0 to n−1 for assigning the topics to set of subscribers 104A-104N. Further, subscription manager 154 may maintain cache 156 to store the list of topics corresponding to endpoint 102A. Example cache 156 may be a least recently used (LRU) cache.

Furthermore, message broker 110 may route data corresponding to the topics to set of subscribers 104A-104N in accordance with the topics assigned to set of subscribers 104A-104N. In one example, message broker 110 may receive the data associated with the applications from agent 108A according to a second interval. In one example, the second interval may be less than the first interval. For example, agent 108A may monitor applications running in endpoint 102A and publish the data. Further, message broker 110 may route the data to set of subscribers 104A-104N in accordance with the topics assigned to set of subscribers 104A-104N. For example, the received data may be "mysql.cpu.usaage12<timestamp>" and "mysql.mem.usuage45<timestamp>". Since the data is associated with "/endpoint1/MySQL", the data may be routed to subscriber 104A.

Further in operation, message broker 110 may receive the topic metadata at a second instance according to the first interval from agent 108A. Further, topic list subscriber 152 may obtain an updated list of topics from the topic metadata received at the second instance and update cache 156 to store the updated list of topics. Furthermore, subscription manager 154 may modify a number of subscribers in set of subscribers 104A-104N based on the updated list of topics.

In one example, cache 156 may facilitate in removing topics for an endpoint, from which data has not received for a predefined period of time. Also, when a topic list is received again from the endpoint, cache 156 may be updated. Thus, addition and/or removal of topics from each endpoint may be achieved using cache 156. Also, cache 156 may facilitate in adding and/or removing subscribers based on load (i.e., a number of overall topics).

Further, subscription manager 154 may then dynamically assign topics in the updated list of topics to set of subscribers 104A-104N. Accordingly, message broker 110 may route the data to set of subscribers 104A-104N in accordance with the updated topics assigned to set of subscribers 104A-104N.

In some examples, the functionalities described in FIGS. 1A and 1B, in relation to instructions to implement functions of message broker 110, topic list subscriber 152, subscription manager 154, and any additional instructions described herein in relation to the storage medium, may be implemented as engines or modules including any combination of hardware and programming to implement the functionalities of the modules or engines described herein. The functions of message broker 110, topic list subscriber 152 and subscription manager 154 may also be implemented by a respective processor. In examples described herein, the processor may include, for example, one processor or multiple processors included in a single device or distributed across multiple devices. In one example, examples described herein may be implemented in application management solutions such as VMware Application Proxy™ (VAP) (also referred to as Application Remote Collector (ARC)) offered by VMware. Further, examples described herein may be implemented in VAP-vRealize Operations integration to load balance messages to clustered set of adapters.

Example Processes

Figure 2:
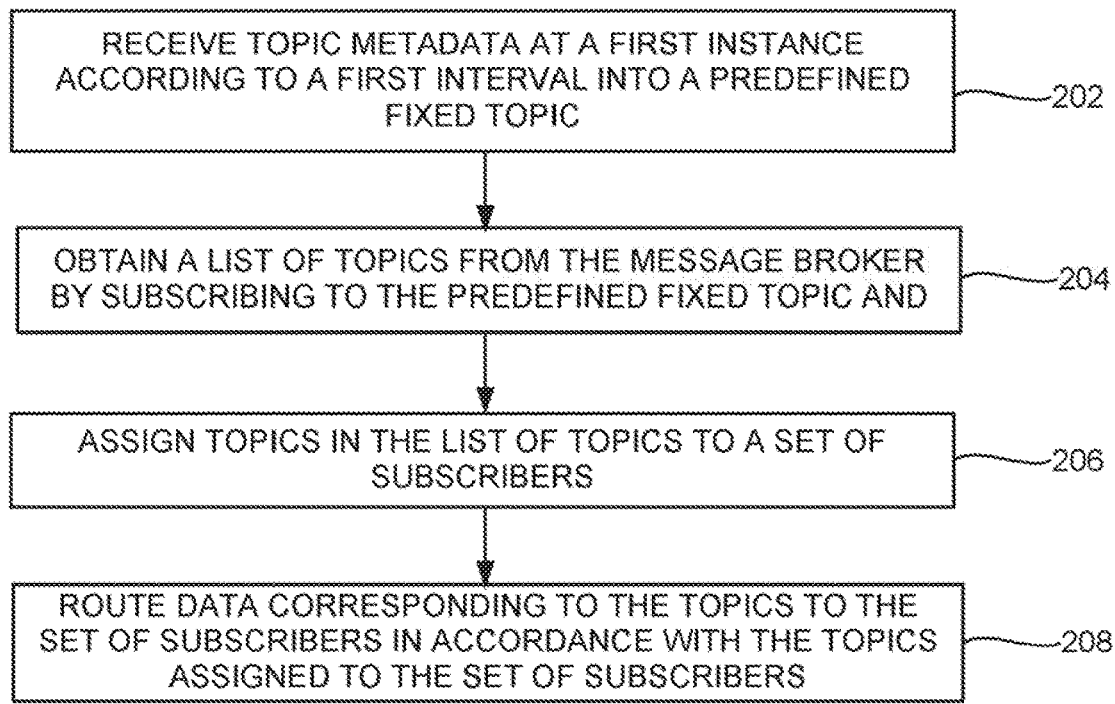
FIG. 2 is an example flow diagram illustrating routing data corresponding to topics to a set of subscribers in accordance with the topics assigned to the set of subscribers.

FIG. 2 is an example flow diagram 200 illustrating routing data corresponding to topics to a set of subscribers in accordance with the topics assigned to the set of subscribers. At 202, topic metadata may be received by a message broker at a first instance according to a first interval into a predefined fixed topic. In one example, the topic metadata may include information about a list of topics published by an agent running in an endpoint and each topic in the list of topics may correspond to an application running in the endpoint.

At 204, the list of topics may be obtained by a topic list subscriber from the message broker by subscribing to the predefined fixed topic. At 206, topics in the list of topics may be assigned to a set of subscribers according to a criteria by a subscription manager. In one example, the topics may be assigned to the set of subscribers using the criteria such as a round robin distributing algorithm, a hashing algorithm, a priority scheduling algorithm, or the like. Further, a cache may be maintained to store the list of topics corresponding to the endpoint.

At 208, data corresponding to the topics may be routed to the set of subscribers by the message broker in accordance with the topics assigned to the set of subscribers. In one example, routing the data may include receiving the data associated with the applications from the agent according to a second interval. Example data may be published by the agent. For example, the second interval may be less than the first interval. Further, the data may be routed to the set of subscribers in accordance with the topics assigned to the set of subscribers.

Figure 3:
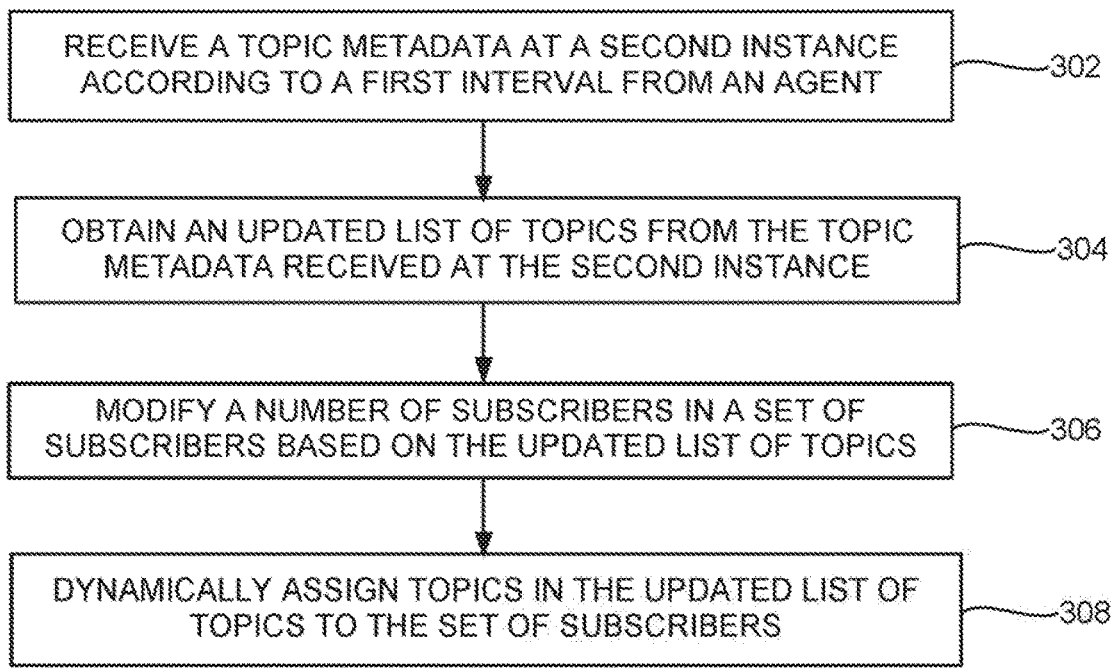
FIG. 3 is an example flow diagram illustrating dynamically modifying the topics assigned to the set of subscribers upon receiving an updated list of topics.

FIG. 3 is an example flow diagram 300 illustrating dynamically modifying the topics assigned to the set of subscribers upon receiving an updated list of topics. At 302, the topic metadata may be received by a message broker at a second instance according to a first interval from an agent. At 304, an updated list of topics may be obtained from the topic metadata received at the second instance by a topic list subscriber. In one example, a cache may be updated to store the updated list of topics.

At 306, a number of subscribers in a set of subscribers may be modified by a subscription manager based on the updated list of topics. At 308, topics in the updated list of topics may be dynamically assigned to the set of subscribers.

It should be understood that the processes depicted in FIGS. 2 and 3 may represent generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figure 4:
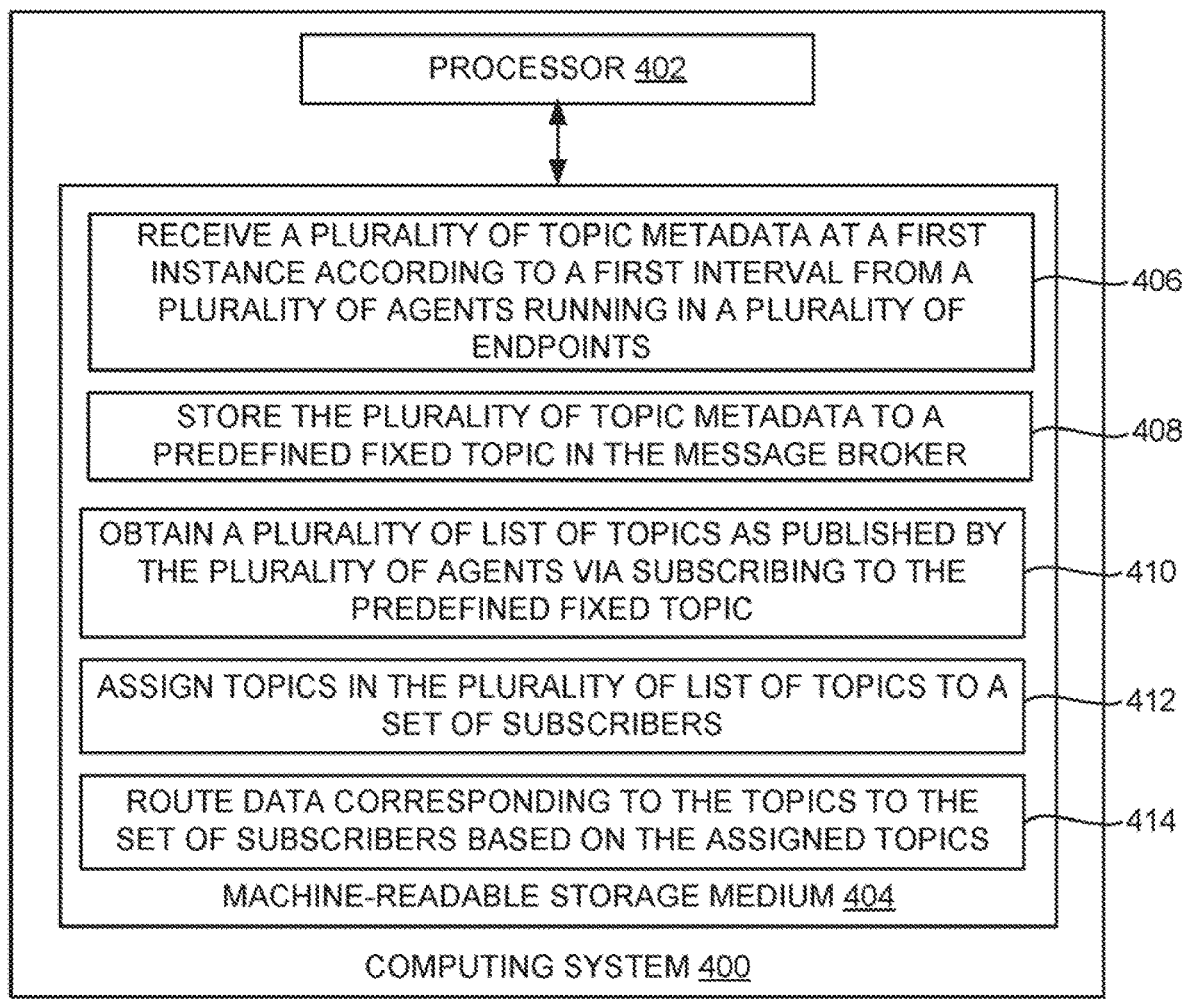
FIG. 4 is a block diagram of an example computing system including a non-transitory computer-readable storage medium, storing instructions to provide topic-based data routing in a publish-subscribe messaging environment.

FIG. 4 is a block diagram of an example computing system 400 including a non-transitory computer-readable storage medium 404, storing instructions to provide topic-based data routing in a publish-subscribe messaging environment. Computing system 400 may include a processor 402 and machine-readable storage medium 404 communicatively coupled through a system bus. Processor 402 may be any type of central processing unit (CPU), microprocessor, or processing logic that interprets and executes machine-readable instructions stored in the machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to computing system 400.

Machine-readable storage medium 404 may store instructions 406-414. In an example, instructions 406-414 may be executed by processor 402 to provide topic-based data routing in the publish-subscribe messaging environment. Instructions 406 may be executed by processor 402 to receive a plurality of topic metadata by a message broker at a first instance according to a first interval from a plurality of agents running in a plurality of endpoints. In one example, each topic metadata may include information about a list of topics published by an agent running in an endpoint and each topic in the list of topics may correspond to an application running in the endpoint. Instructions 408 may be executed by processor 402 to store the plurality of topic metadata to a predefined fixed topic in the message broker. Instructions 410 may be executed by processor 402 to obtain a plurality of list of topics as published by the plurality of agents via subscribing to the predefined fixed topic. Further, the instructions may include to maintain a cache to store the plurality of list of topics corresponding to the plurality of endpoint. Instructions 412 may be executed by processor 402 to assign topics in the plurality of list of topics to a set of subscribers.

Further, Instructions 414 may be executed by processor 402 to route data corresponding to the topics to the set of subscribers based on the assigned topics. In one example, the instructions to route the messages may include instructions that when executed by the processor, cause the processor to receive the data associated with a plurality of applications from the plurality of agents according to a second interval and route the data to the set of subscribers in accordance with the topics assigned to the set of subscribers. In one example, the second interval may be less than the first interval.

Furthermore, the instructions may include to receive the plurality of topic metadata at a second instance according to the first interval from the plurality of agents, obtain a plurality of updated list of topics from the plurality of topic metadata received at the second instance, and update the cache to store the plurality of updated list of topics. Further, the instructions may include to modify a number of subscribers in the set of subscribers based on the plurality of updated list of topics and dynamically assign topics in the plurality of updated list of topics to the set of subscribers.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system in a publish-subscribe messaging environment, comprising:
   a processor; and
   memory coupled to the processor, wherein the memory comprises:
   a message broker to receive topic metadata at a first instance according to a first interval into a predefined fixed topic, wherein the topic metadata comprise information about a list of topics published by an agent running in an endpoint and each topic in the list of topics corresponds to an application running in the endpoint;
   a topic list subscriber that subscribes to the predefined fixed topic and obtains the list of topics from the message broker; and
   a subscription manager to assign topics in the list of topics to a first subscriber and a second subscriber according to a criteria, wherein the message broker receives data associated with the applications from the agent according to a second interval and routes the received data corresponding to the topics to the first and second subscribers in accordance with the topics assigned to the first and second subscribers, and wherein at least one topic assigned to the first subscriber is different from the topics assigned to the second subscriber.

2. The system of claim 1, wherein the second interval is less than the first interval.

3. The system of claim 1, wherein the subscription manager is to assign the topics to the first and second subscribers using one of a round robin distributing algorithm, a hashing algorithm, and a priority scheduling algorithm.

4. The system of claim 1, wherein the topic list subscriber is to transmit the list of topics to the subscription manager for assigning the topics to the first and second subscribers upon receiving the topic metadata at each instance according to the first interval.

5. The system of claim 1, further comprising:
   a cache to maintain the list of topics corresponding to the endpoint.

6. The system of claim 5, wherein the message broker is to receive the topic metadata at a second instance according to the first interval from the agent.

7. The system of claim 6, wherein the topic list subscriber is to obtain an updated list of topics from the topic metadata received at the second instance and update the cache to store the updated list of topics.

8. The system of claim 7, wherein the subscription manager is to:
   modify a number of subscribers based on the updated list of topics; and
   dynamically assign topics in the updated list of topics to the first and second subscribers.

9. The system of claim 1, wherein the endpoint comprises one of a virtual machine, a container, and a physical machine.

10. A computer-implemented method to route data in a publish-subscribe messaging environment, comprising:
    receiving, by a message broker, topic metadata at a first instance according to a first interval into a predefined fixed topic, wherein the topic metadata comprise information about a list of topics published by an agent running in an endpoint and each topic in the list of topics corresponds to an application running in the endpoint;
    obtaining, by a topic list subscriber, the list of topics from the message broker by subscribing to the predefined fixed topic;
    assigning, by a subscription manager, topics in the list of topics to a first subscriber and a second subscriber according to a criteria;
    receiving, by the message broker, data associated with the applications from the agent according to a second interval; and
    routing, by the message broker, the received data corresponding to the topics to the first and second subscribers in accordance with the topics assigned to the first and second subscribers, wherein at least one topic assigned to the first subscriber is different from the topics assigned to the second subscriber.

11. The computer-implemented method of claim 10, wherein the data is published by the agent and wherein the second interval is less than the first interval.

12. The computer-implemented method of claim 10, wherein the topics are assigned to the first and second subscribers using one of a round robin distributing algorithm, a hashing algorithm, and a priority scheduling algorithm.

13. The computer-implemented method of claim 10, further comprising:
    maintaining a cache to store the list of topics corresponding to the endpoint.

14. The computer-implemented method of claim 10, further comprising:
    receiving, by the message broker, the topic metadata at a second instance according to the first interval from the agent;
    obtaining, by the topic list subscriber, an updated list of topics from the topic metadata received at the second instance; and
    updating the cache to store the updated list of topics.

15. The computer-implemented method of claim 14, further comprising:
    modifying, by the subscription manager, a number of subscribers based on the updated list of topics; and
    dynamically assigning topics in the updated list of topics to the first and second subscribers.

16. A non-transitory computer readable storage medium having instructions that when executed by a processor, cause the processor to:
    receive, by a message broker, a plurality of topic metadata at a first instance according to a first interval from a plurality of agents running in a plurality of endpoints, wherein each topic metadata comprise information about a list of topics published by an agent running in an endpoint and each topic in the list of topics corresponds to an application running in the endpoint;
    store the plurality of topic metadata to a predefined fixed topic in the message broker;
    obtain a plurality of list of topics as published by the plurality of agents via subscribing to the predefined fixed topic;
    assign topics in the plurality of list of topics to a first subscriber and a second subscriber according to a criteria;
    receive data associated with a plurality of applications from the plurality of agents according to a second interval; and route the received data corresponding to the topics to the first and second subscribers based on the assigned topics, wherein at least one topic assigned to the first subscriber is different from the topics assigned to the second subscriber.

17. The non-transitory computer readable storage medium of claim 16, wherein the second interval is less than the first interval.

18. The non-transitory computer readable storage medium of claim 16, wherein the topics are assigned to the first and second subscribers using one of a round robin distributing algorithm, a hashing algorithm, and a priority scheduling algorithm.

19. The non-transitory computer readable storage medium of claim 16, further comprising instructions that when executed by the processor, cause the processor to maintain a cache to store the plurality of list of topics corresponding to the plurality of endpoint.

20. The non-transitory computer readable storage medium of claim 19, further comprising instructions that when executed by the processor, cause the processor to:

receive the plurality of topic metadata at a second instance according to the first interval from the plurality of agents;

obtain a plurality of updated list of topics from the plurality of topic metadata received at the second instance;

update the cache to store the plurality of updated list of topics;

modify a number of subscribers based on the plurality of updated list of topics; and dynamically assign topics in the plurality of updated list of topics to the first and second subscribers.

* * * * *